United States Patent
Stanger

(10) Patent No.: US 7,212,248 B2
(45) Date of Patent: May 1, 2007

(54) METHOD AND APPARATUS FOR LIPSYNC MEASUREMENT AND CORRECTION

(75) Inventor: Leon J. Stanger, Farmington, UT (US)

(73) Assignee: The DirecTV Group, Inc., El Segundo, CA (US)

( * ) Notice: Subject to any disclaimer, the term of this patent is extended or adjusted under 35 U.S.C. 154(b) by 525 days.

(21) Appl. No.: 10/654,836

(22) Filed: Sep. 4, 2003

(65) Prior Publication Data
US 2004/0100582 A1 May 27, 2004

Related U.S. Application Data

(60) Provisional application No. 60/409,346, filed on Sep. 9, 2002.

(51) Int. Cl.
H04N 5/91 (2006.01)
H04N 9/75 (2006.01)

(52) U.S. Cl. ............ 348/515; 348/512; 348/517; 348/518; 348/423.1

(58) Field of Classification Search ........... 348/512, 348/515–517, 423.1; H04N 5/91, 9/75
See application file for complete search history.

(56) References Cited

U.S. PATENT DOCUMENTS

| | | | |
|---|---|---|---|
| 4,099,202 A | 7/1978 | Cavanaugh | |
| 4,218,705 A | 8/1980 | Inaba et al. | |
| 4,313,135 A * | 1/1982 | Cooper | 348/512 |
| 4,618,890 A | 10/1986 | Kouyama et al. | |
| 4,703,355 A | 10/1987 | Cooper | |
| 4,743,981 A | 5/1988 | Spencer et al. | |
| 4,851,909 A | 7/1989 | Noske et al. | |
| 4,963,967 A * | 10/1990 | Orland et al. | 348/484 |
| 4,969,041 A * | 11/1990 | O'Grady et al. | 348/473 |
| RE33,535 E * | 2/1991 | Cooper | 348/512 |
| 5,091,947 A * | 2/1992 | Ariyoshi et al. | 704/246 |
| 5,243,424 A | 9/1993 | Emmett | |
| 5,365,579 A | 11/1994 | Hendrickson | |
| 5,572,261 A * | 11/1996 | Cooper | 348/512 |
| 5,642,171 A * | 6/1997 | Baumgartner et al. | 348/515 |
| 5,751,368 A * | 5/1998 | Cooper | 348/512 |
| 5,818,520 A * | 10/1998 | Janko et al. | 348/192 |

(Continued)

OTHER PUBLICATIONS

Michael Robin et al., *Digital Television Fundamentals—Design And Installation Of Video And Audio Systems*, McGraw-Hill, Chapter 8, title page(s) and pp. 345-425.

Primary Examiner—Brian P. Yenke
(74) Attorney, Agent, or Firm—Georgann S. Grunebach

(57) ABSTRACT

A method and apparatus for synchronizing audio and video portions of a media program signal is disclosed. The method comprises the steps of detecting an audio event in the audio portion of the media program signal, measuring the timing interval from the audio event to a subsequent video synchronization pulse in the video portion of the media program signal, and storing the timing interval in a third portion of the media program signal. The apparatus comprises a voice detector for detecting an audio event in the audio portion of the media program signal, a timer for measuring the timing interval from the audio event to a subsequent video synchronization pulse in the video portion of the media program signal, and a processor for storing the timing interval in a third portion of the media program signal.

31 Claims, 5 Drawing Sheets

U.S. PATENT DOCUMENTS

| | | |
|---|---|---|
| 5,880,788 A * | 3/1999 | Bregler .................... 348/515 |
| 6,097,558 A * | 8/2000 | Oguro ...................... 360/22 |
| 6,233,389 B1 * | 5/2001 | Barton et al. ................ 386/46 |
| 6,246,439 B1 * | 6/2001 | Zink et al. .................. 348/473 |
| 6,269,122 B1 * | 7/2001 | Prasad et al. ........... 375/240.28 |
| 6,330,033 B1 * | 12/2001 | Cooper ..................... 348/512 |
| 6,373,960 B1 * | 4/2002 | Conover et al. ............ 382/100 |
| 6,414,960 B1 | 7/2002 | Kuhn et al. |
| 6,480,902 B1 * | 11/2002 | Yuang et al. ............... 709/248 |
| 6,697,120 B1 * | 2/2004 | Haisma et al. ............. 348/515 |
| 6,757,300 B1 | 6/2004 | Pages et al. |
| 6,836,295 B1 | 12/2004 | Cooper |
| 6,906,755 B2 * | 6/2005 | Lundblad et al. ........... 348/515 |
| 6,912,010 B2 * | 6/2005 | Baker et al. ................ 348/515 |
| 6,961,512 B1 * | 11/2005 | Cho ............................ 386/95 |
| 7,020,894 B1 * | 3/2006 | Godwin et al. ............. 725/135 |
| 7,043,749 B1 | 5/2006 | Davies |
| 2002/0140857 A1 * | 10/2002 | Limaye ..................... 348/515 |
| 2002/0140859 A1 * | 10/2002 | Kariatsumari .............. 348/515 |
| 2003/0122964 A1 * | 7/2003 | Hara ......................... 348/515 |
| 2003/0142232 A1 * | 7/2003 | Albean ...................... 348/512 |
| 2004/0179043 A1 * | 9/2004 | Viellescaze et al. ........ 345/861 |
| 2004/0227856 A1 * | 11/2004 | Cooper ...................... 348/512 |
| 2006/0007356 A1 * | 1/2006 | Junkersfeld et al. ........ 348/515 |

* cited by examiner

METHOD AND APPARATUS FOR LIPSYNC MEASUREMENT AND CORRECTION

CROSS-REFERENCE TO RELATED APPLICATIONS

This application claims benefit of U.S. Provisional Patent Application No. 60/409,346 entitled "METHOD AND APPARATUS FOR LIPSYNC MEASUREMENT AND CORRECTION," by Leon J. Stanger, filed Sep. 9, 2002, which application is hereby incorporated by reference herein.

BACKGROUND OF THE INVENTION

1. Field of the Invention

The present invention relates to systems and methods for transmitting data, and in particular to a system and method for measuring and correcting for audio to video synchronization errors.

2. Description of the Related Art

In presenting media programs such as films and television programs, it is important that the video portion of the program and the audio portion of the program be adequately synchronized. While digital processes have generally improved both the audio and video portions of media programs, such processes have not improved the synchronization of the video and audio portions of such programs. In fact, many such processes have contributed to additional synchronization errors over and above those typically experienced with analog systems. Although each segment of the system can be properly timed, the end-to-end accumulation of synchronization errors remains a difficult problem to control.

While systems have been devised to synchronize video and audio portions of media programs, such systems are either not universally effective, or require substantial modification of existing equipment.

What is needed is a simple, yet effective method and system for synchronizing the video and audio portions of media programs. What is further needed is that this system be backwards compatible and not require substantial modification to existing equipment. The present invention satisfies that need.

SUMMARY OF THE INVENTION

To address the requirements described above, the present invention discloses a method and apparatus for synchronizing audio and video portions of a media program signal. The method comprises the steps of detecting an audio event in the audio portion of the media program signal, measuring the timing interval from the audio event to a subsequent video synchronization pulse in the video portion of the media program signal, and storing the timing interval in a third portion of the media program signal. The apparatus comprises an audio event detector for detecting an audio event in the audio portion of the media program signal, a timer for measuring the timing interval from the audio event to a subsequent video synchronization pulse in the video portion of the media program signal, and a processor for storing the timing interval in a third portion of the media program signal.

The present invention identifies naturally occurring timing points within the audio program and marks the timing relationship to the video program in a third portion of the media program signal such as the portion used for closed captioning. After the video has been marked, it is transmitted to a receiver, where it is read and compared to the original timing marks. In one embodiment, the present invention uses the closed caption standard described in EIA 608/708, (e.g. ANSI/EIA/CEA-608-B, which is hereby incorporated by reference herein). Since the closed caption standard, EIA 608 is widely used, it is possible to measure, and correct errors at any point in the distribution chain, even in consumer equipment.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
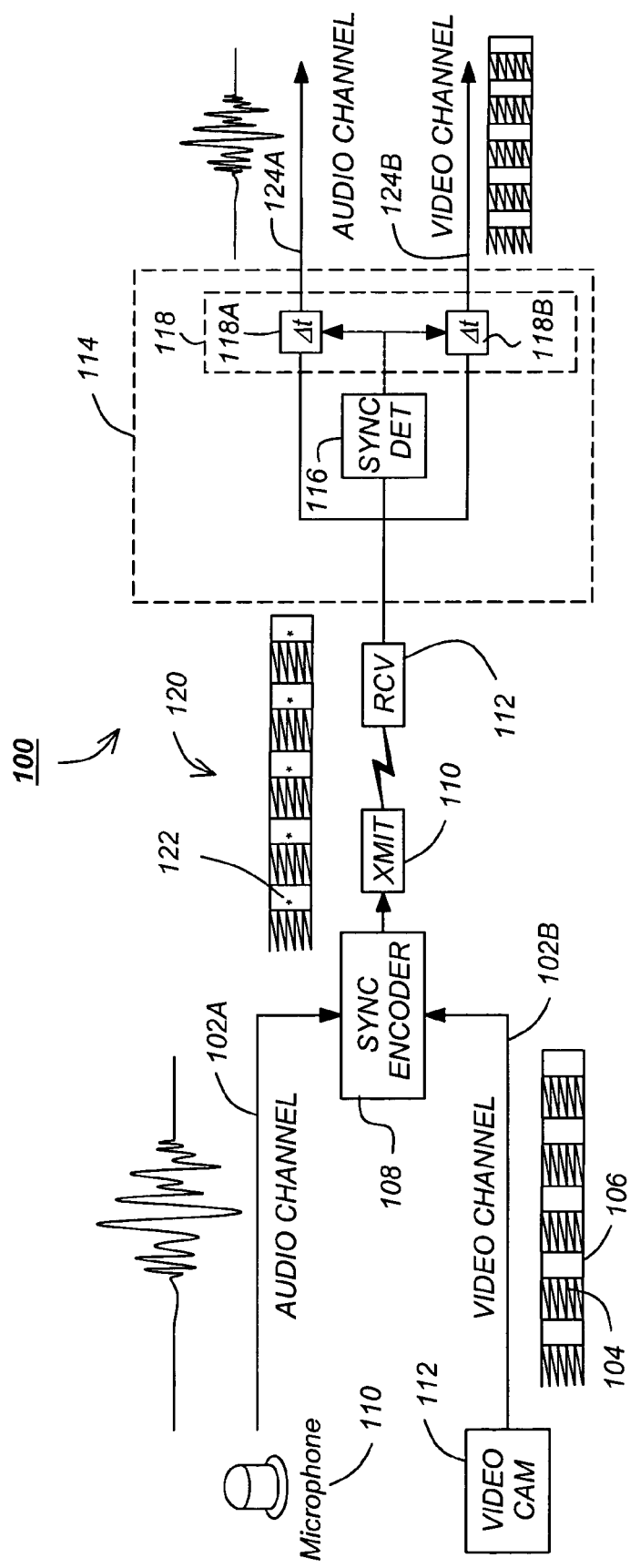
FIG. 1 is a diagram depicting a media distribution system.

FIG. 1 is a diagram depicting a media distribution system 100 employing one embodiment of the present invention. A media program signal 102 comprising an audio portion or channel 102A and a video portion or channel 102B is provided to a synchronization encoder 108. The video portion 102B of the media program signal 102 includes video segments 104 having picture information such as video frames and non-video segments 106. The non-video segments 106 include, for example, the closed captioning information in line 21 of the media program signal, information in the vertical blanking interval (VBI), and/or other information. The synchronization encoder 108 adds synchronization information in the to the media program signal 102 to generate a sync-encoded media program signal 120. In the illustrated embodiment, the synchronization information (conceptually illustrated by the asterisks 122 in FIG. 1) is added to the non-video segments 106 of the video portion 102B of the media program signal 102. However, the synchronization information can also be added to the video segments 104 in an unobtrusive manner, for example, by adding the information in the first line of active video in each frame of the video signal 102B. Because the overwhelming majority of television sets are not aligned with sufficient precision to show the first video line, the synchronization information is virtually invisible to virtually all viewers.

The sync-encoded media program signal 120 is transmitted by transmitter 110 and received by receiver 112. The received sync modified media program signal 120 is provided to a synchronization decoder 114. A synchronization detector 115 detects the synchronization information in the sync modified media program signal 120 and uses that information to control a variable delay element 118 to synchronize the audio 124A and video 124B channels of the media program signal.

The sync-encoded media program signal 120 can be transmitted and received via satellite, cable, the Internet, land line, or other means. For example, the media program signal 102 may be a live broadcast such as a basketball game. The audio portion 102A and video portions 102B of the media program 102 are provided to the synchronization encoder 108, and the sync-encoded media program signal 120 provided via satellite or cable to a signal distributor, where additional program material (e.g. advertisements and other information) is added or the media program is edited, and thenceforth transmitted (again, via satellite, cable, or other means) to media program distributors such as satellite or cable distribution systems. In another embodiment, the media program signal 102 is a signal provided by a media program distributor. In this embodiment, synchronization information is added to the media program signal as described above to produce the sync-encoded media program signal 120, and this signal is transmitted to customers having satellite, cable or broadcast television receivers. The television receivers decode the sync-encoded media program signal 120 to recover the synchronization information, and correct for audio/video synchronization errors before presenting the media program to the viewer.

In the illustrated embodiment, the audio portion 102A is provided by a microphone, and the video portion 102B is provided by a video camera 112. However, the synchronization encoder 108 may also accept a composite signal including both the audio portion 102A and video portion 102B. In this case, the synchronization decoder decodes the audio and video portions 102A, 102B of the media program signal 102 before encoding the synchronization information.

The functionality implemented in the blocks depicted in FIG. 1 can be implemented by one or more hardware modules, one or more software modules defining instructions performed by a processor, or a combination of both.

Synchronization Encoding

Figure 2:
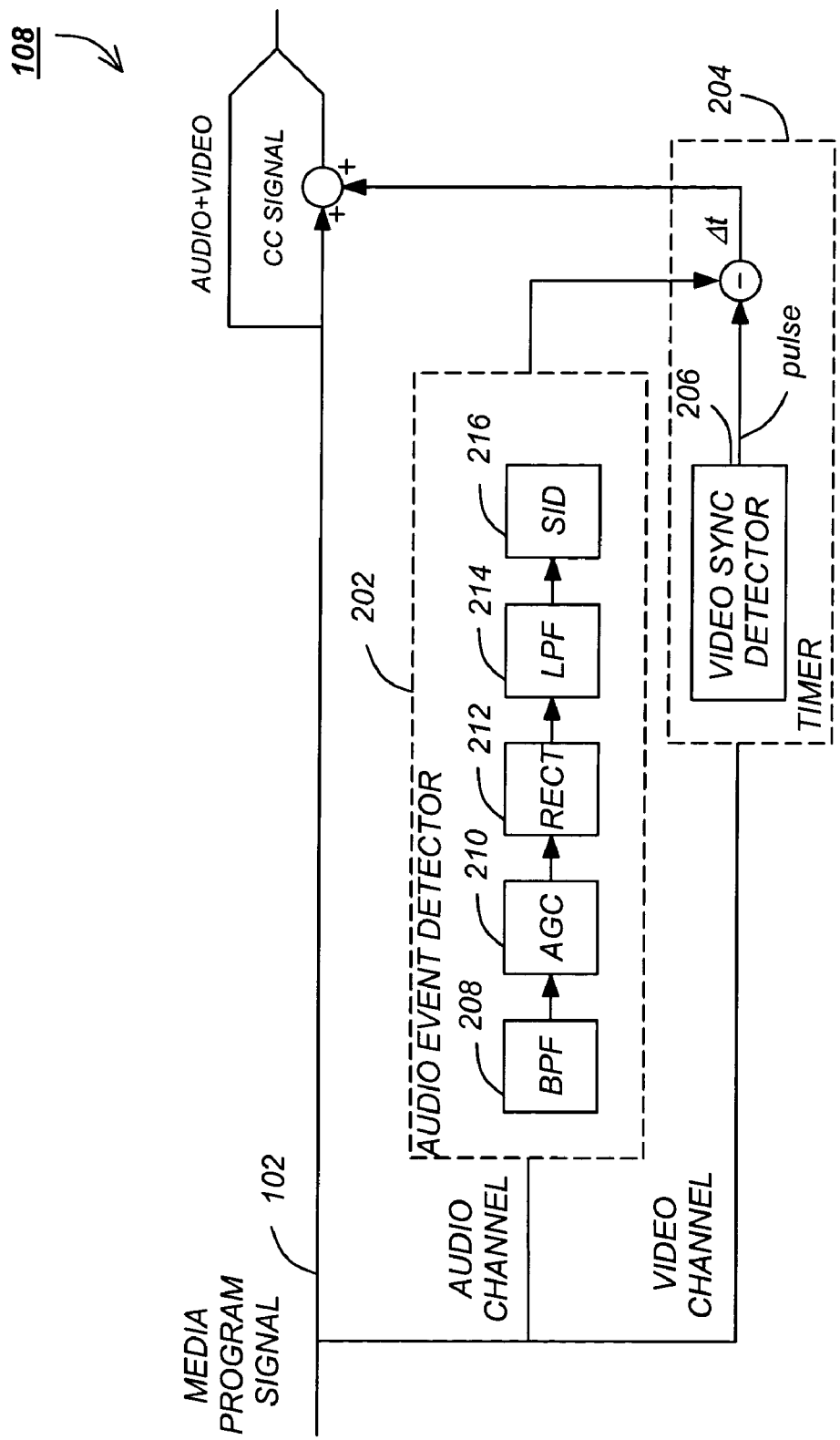
FIG. 2 is a block diagram depicting one embodiment of a synchronization encoder 108.

FIG. 2 is a block diagram depicting one embodiment of a synchronization encoder 108. FIG. 2 will be discussed with reference to FIGS. 3A and 3B, which present flowcharts describing exemplary process steps that can be used to practice one embodiment of the invention.

Figure 3A:
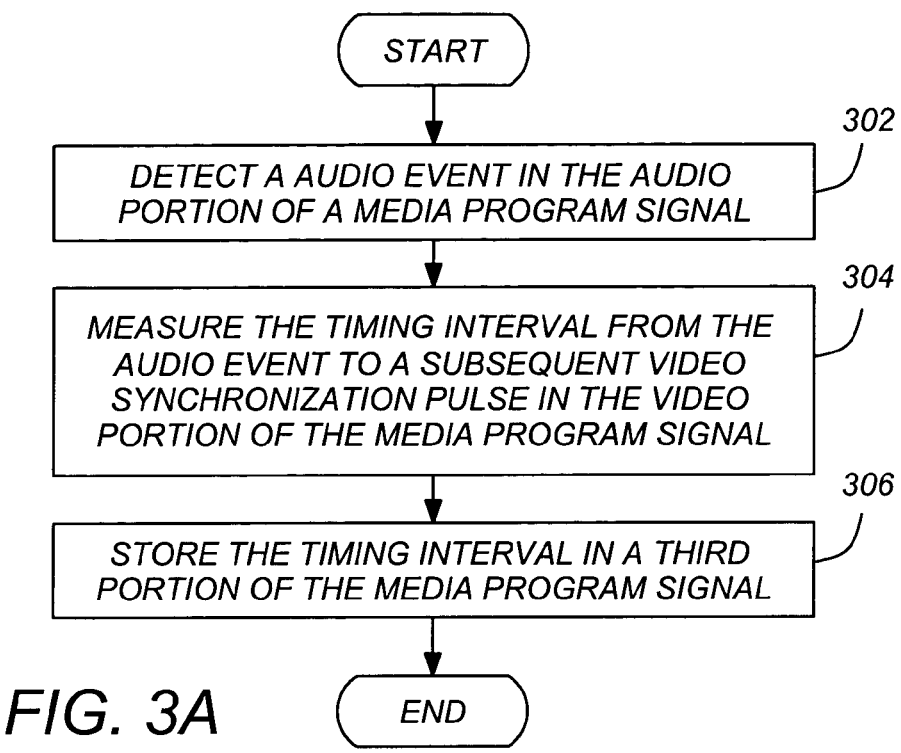
FIGS. 3A and 3B are flow charts depicting the synchronization encoding of the media program signal.

Referring to FIG. 3A, the audio portion of the incoming media program signal is examined to detect an audio event. This is shown in block 302. This can be performed, for example, by the audio event detector 202 shown in FIG. 2. The audio event can be any identifiable pattern in the audio portion 102A or the media program signal 102. In one embodiment, the audio event comprises a period of silence followed by an abrupt increase in audio signal intensity. This characteristic is hereinafter termed a "start of sentence" or SoS, but need not be in fact, the start of a sentence.

In another embodiment, the audio event comprises a significant increase in the signal intensity of the low frequency portion of the audio spectrum, such as a drum beat.

In another embodiment, the audio event comprises a significant increase in the signal intensity of a high-frequency portion of the audio spectrum, such as a cymbal crash. The audio event can also be determined from more than one measure. For example, two audio sub-events occurring at the same time, such as a musical chord having multiple notes played at the same time. The audio event can also be determined using speech processing software algorithms which identify words or phrases, particularly those associated with the start of a sentence.

In one embodiment, the audio event detector 202 comprises a voice detector which detects the start of a sentence in the audio portion of the signal. Next, synchronization information such as a timing interval from the audio event to a datum is measured, as shown in block 304. This can be performed, for example, by the timer 204 shown in FIG. 2. In one embodiment, the datum is the video synchronization pulse in the video portion 102B of the media program signal 102. The timing interval is then stored in a third portion of the media program signal, as shown in block 306.

In one embodiment, the synchronization information is stored in a portion of the non-video segment 106 of the video portion 102B of the media program signal 102. For example, the synchronization information may be stored in the portion of the media program signal 102 ordinarily dedicated to transmitting closed captioning information (e.g. line 21), as described further below. The synchronization information may also be transmitted in other lines (e.g. line 20), or even in part of a video segment 104. For example, the vast majority of televisions are aligned so that many of the video lines around the edges of the picture are not displayed (this prevents alignment errors from causing black stripes on the periphery of the video image). The synchronization information can therefore be stored in one of the video lines near the periphery of the image without disturbing the presented video image in the overwhelming majority of television receivers.

Figure 3B:
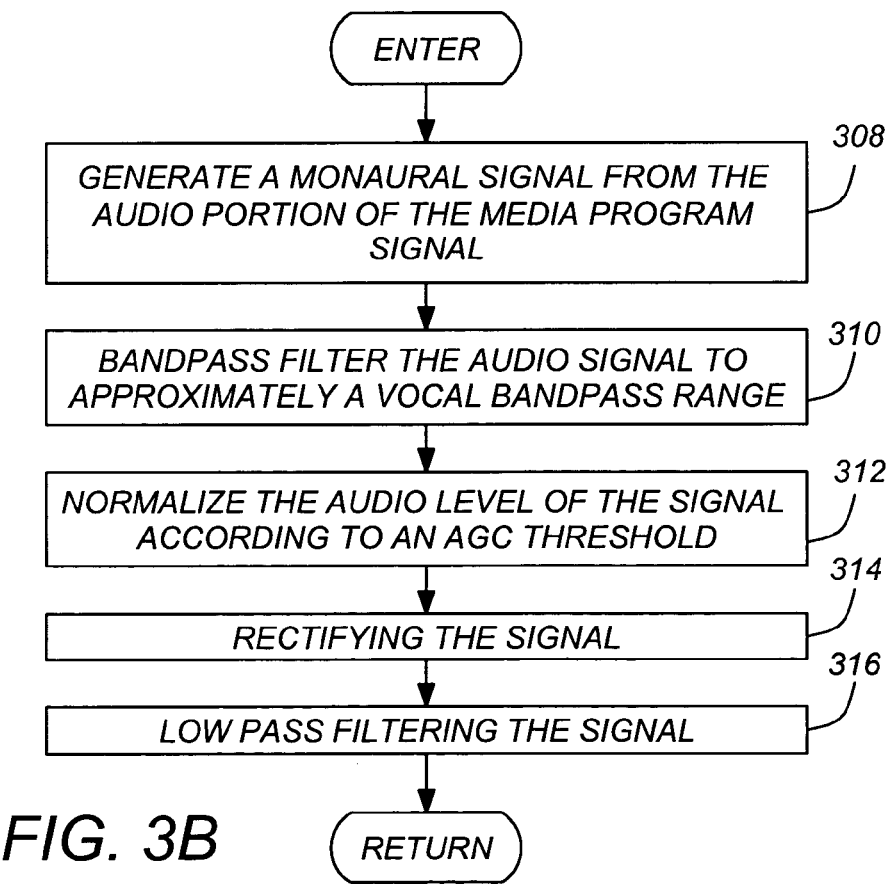

FIG. 3B is a flow chart illustrating exemplary process steps that can be used to detect the audio event in the audio portion of the media program signal 102. The audio portion of the media program signal may be a stereo signal with right and left components or a multi-channel coded signal. To minimize the impact of multi-channel effects on the determination of the audio event, a monaural version of the audio portion of the media program signal may be generated, as shown in block 308. While not necessary, this can improve the accuracy of the audio event determination. In surround sound applications, the back channel signals are mixed to LT and RT, and a monaural channel is created by summing the LT and RT signals.

Next, the audio component of the media program signal is bandpass-filtered to a range. In embodiments in which the audio event is based on vocal information, the bandpass filter approximates that of the vocal bandpass range for human being. This is shown in block 308 and can be performed, for example, by the bandpass filter 208 shown in FIG. 2. In one embodiment, this is performed by a Gaussian bandpass filter having—3 dB points at 500 and 2200 Hz. The selection of this bandpass region passes most of the human voice, but rejects most system noise.

The audio level of the audio portion of the media program signal is then normalized, as shown in block 312. This can be accomplished, for example, by the automatic gain control (AGC) module 210 shown in FIG. 2. The attack and decay time of the AGC can be varied to optimize performance. The signal is then rectified and low pass filtered, as shown in blocks 314 and 316, respectively. These operations can be performed by the rectifier 212 and low pass filter (LPF) 214 shown in FIG. 2. In embodiments using vocal audio events (including one using the start of sentence as the audio event), the resulting pre-processed signal is applied to a silence interval detector (SID) 216 which determines a silence interval $t_s$, during which the pre-processed audio signal has an amplitude below the AGC threshold and identifies the end of the silence interval as the start of sentence time if the silence interval ts exceeds a silence interval threshold $t_{s_{thresh}}$.

Figure 4:
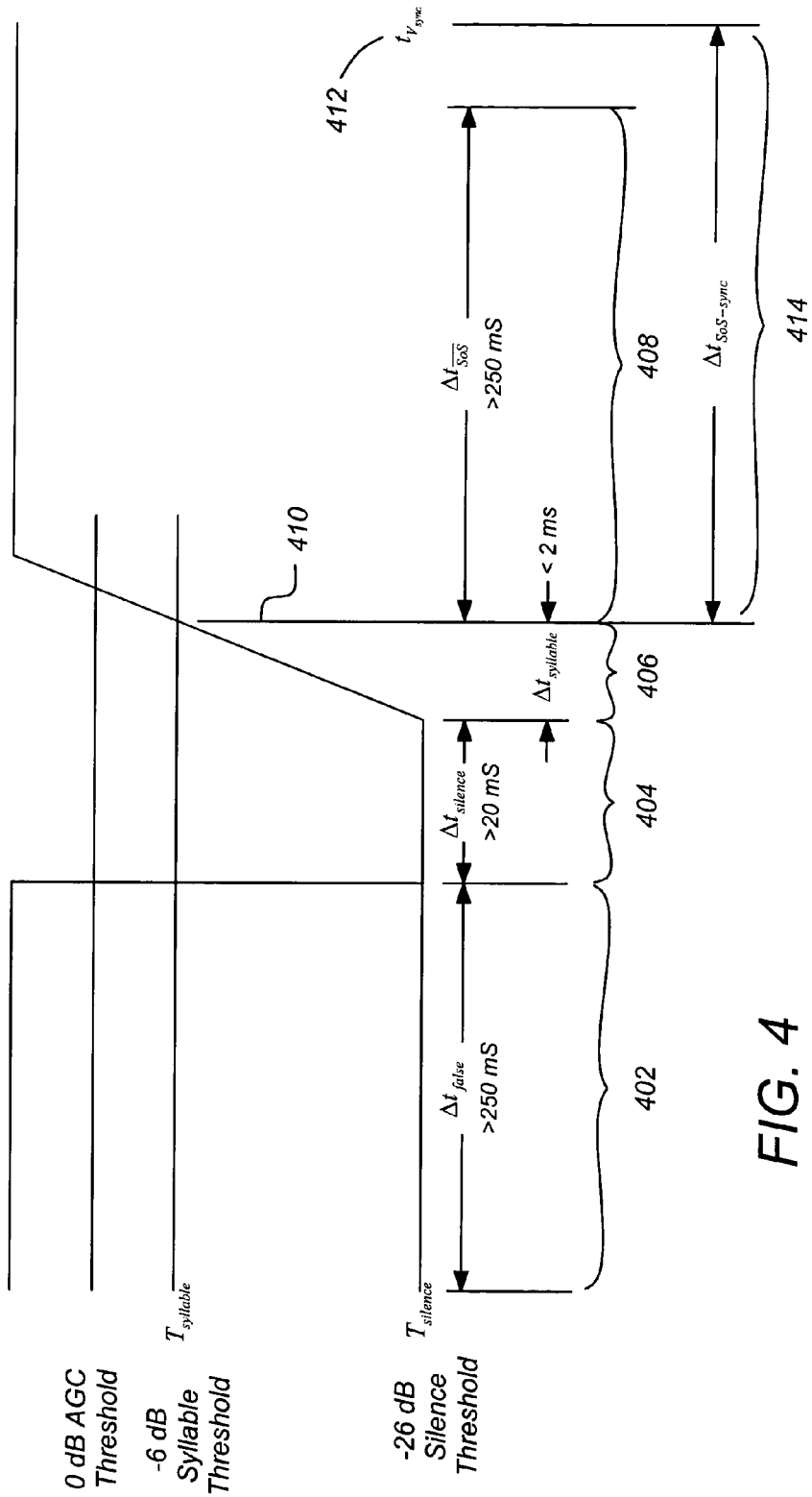
FIG. 4 is a diagram depicting one example of how an audio event can be defined.

FIG. 4 is a diagram illustrating one example of how a start of sentence (SoS) period can be defined. In this embodiment, a SoS period is defined as a period of silence followed by a syllable (or abrupt increase in audio level).

To reduce errors, the start of the sentence period is defined according to the set of rules. These rules make use of characterizations of the processed signal as being (1) silent, or a (2) syllable. The processed signal can be characterized as "silent" when the amplitude of the processed signal is below a silence threshold $T_{silence}$. In one embodiment, the silence threshold $T_{silence}$ is 26 dB below the AGC threshold. The processed signal can be characterized as a syllable when the processed signal magnitude is above a syllable threshold $T_{syllable}$.

It is also useful to define a silence interval $\Delta t_{silence}$ 404 of the processed signal as a time interval when the processed signal remains silent for a minimum time period min $\Delta t_{silence}$. For example, in the embodiment illustrated in FIG. 4D, the signal is deemed to be silent when the processed signal remains at least 20 dB below the AGC threshold for at least 20 milliseconds. Time interval 404 represents an exemplary silent period.

From these definitions of "silence," a "syllable" and a "silent period," the rules for determining a SoS can be defined. In the exemplary embodiment shown in FIG. 4, a SoS is identified when the processed signal is at or below the silence threshold $T_{silence}$ for a minimum time period $\Delta t_{silence}$ 404, followed by an increase in the amplitude of the processed signal to at least the syllable threshold $T_{syllable}$ within a syllable rise time $\Delta t_{syllable}$ 406. In addition, a valid SoS must have no false SoS designations in the within a period $\Delta t_{false}$ 402 of the onset of the silence period $\Delta t_{silence}$. A false SoS designation is one in which there is $\Delta t_{silence}$ of silence followed by a syllable, but the processed signal does not violate other timing constraints. An examples of one such timing constraint is a constraint which requires that there are no similarly identified events within a preceding time period (e.g. no SoS designations within a preceding period). Finally, once a valid SoS has been identified and an SoS timing reference 410 marked, another SoS is not identified for a minimum period of $\Delta t_{\overline{SoS}}$ 408. In the embodiment illustrated in FIG. 4D, representative values for $\Delta t_{false}$ 402, $\Delta t_{silence}$ 404, $\Delta t_{syllable}$ 406, and $\Delta t_{\overline{SoS}}$ 408 are >250 milliseconds, >20 milliseconds, <2 milliseconds, and >250 milliseconds, respectively.

After the SoS timing reference 410 is found, a timing interval $\Delta t_{SoS-sync}$ 414 from the SoS timing reference 410 to the vertical sync pulse $t_{v_{sync}}$ 412 is determined. Vertical sync pulses are described in "Digital Television Fundamentals, by Michael Robin and Michel Poulin, 1998, which is hereby incorporated by reference herein.

In one embodiment, the reference timing value is determined by rounding to an integer number of milliseconds. Typically, a valid range for the timing interval $\Delta t_{SoS-sync}$ 414 is approximately zero to 17 milliseconds for 30 frame systems, and zero to 20 milliseconds for 25 frame systems. It is noted that the foregoing describes only one embodiment of the present invention. Given the teaching above, it is possible to define an operational system using different values for the parameters above. It should also be noted that the steps of generating a monaural signal, bandpass filtering to a vocal bandpass range, normalizing the signal with AGC, rectifying and further low pass filtering the signal are operations which improve the accuracy of the determination of the SoS, but may not be required to practice the present invention in some embodiments. For example, the start of the sentence can be determined by digital algorithmic techniques that do not involve low pass filtering. Further, while the combination of the multi-channel audio signal to a single monaural signal simplifies the design and operation of the system, the information on such multiple channels may instead be used to improve the start of sentence determination.

After the reference timing value is determined and rounded, it is stored in a third portion of the media program signal. In one embodiment this third portion is the captioning portion of the media program signal.

In the NTSC format, line 21 of the vertical blanking interval (VBI) is allocated to carry two bytes of closed captioning information. Closed captioning information can be included on line 21 of the first field of each video frame and/or on line 21 of the second field of the video frame. The first field of the video frame includes CC1, CC2, Text 1 and Text 2 channels and the second field includes CC3, CC4, Text 3 and Text 4, and XDS channels.

In one embodiment, a plurality of special non-printing characters can be used to represent the timing values. For example, a timing interval $\Delta t_{SoS-sync}$ of 0 msec can be represented by a first non-printing character, a timing interval $\Delta t_{SoS-sync}$ of 10 msec can be represented by a second non-printing character, and so on.

In this embodiment, the maximum rate at which the timing interval values $\Delta t_{SoS-sync}$ 414 can be stored is approximately one every 500 milliseconds. It is preferable to retain any existing closed-captioning information in the signal. Hence, in a preferred embodiment, the timing interval value $\Delta t_{SoS-sync}$ 414 is transmitted in the form of two special characters. If there is CC1, CC3, Text 1 or Text 2 data already present on line 21, the timing interval value $\Delta t_{SoS-sync}$ 414 can be discarded, and the CC1 or CC3 data already present on line 21 is left undisturbed. If line 21 of frame 2 already includes closed captioning information (CC2, CC4, Text 3, Text 4, XDS data), this data may be delayed until the next frame, and the timing interval value $\Delta t_{SoS-sync}$ 414 inserted in its place. Alternatively, the closed captioning information may be simply overwritten.

In another embodiment, the synchronization information is written using printing characters, but is written to closed captioning portions that are not ordinarily viewed by the user. For example, if the closed captioning information is presented in the CC1 channel, any characters can be used to store the synchronization information in the CC2, CC3, CC4, Text 1 or Text 2 channels, even by simply writing the synchronization information values directly. Of course, in this embodiment, if the viewer were to command the television receiver to display CC2 closed-captioning information, this information would be displayed in a closed captioning window, and may appear as random characters or numbers. However, the original closed captioning information is still available and viewable, so long as the user commands the television receiver to display CC1 closed-captioning information.

The estimate of when the SoS occurs can be improved by statistical analysis of the audio and/or video waveforms. Such techniques reduce the probability of errors in the SoS determination caused by imperfect audio measuring equipment and audio distortion. Such statistical analysis can be accomplished by generating a histogram of the results. Correct SoS data points are likely to be closely clustered together, while erroneous results are likely to be widely scattered. Using such analysis, such widely scattered timing references can be disregarded.

The foregoing describes a system and method wherein the third portion of the media program signal is the closed captioning information that is transmitted in the VBI interval in an NTSC signal. However, the present invention can also be practiced with current and evolving digital television standards such as EIA-708. EIA-708 offers an enhanced character set with more accented letters and non-English letters, and more special symbols, and higher bandwidth, as well as other improvements. It is also noted that while the closed captioning may be available in earlier embodiments of MPEG encoding of NTSC signals using captioning encoders, and that current and planned MPEG encoding make specific allowances to transmit closed captioning information. Hence, the present invention may be practiced by storing the timing reference information in the closed captioning portions of the media program signal supported by these formats.

Lipsync timing errors tend to be fixed or to move very slowly. By accumulating data over a period of time and discarding erroneous samples, the timing error can be determined and the synchronization between the video and the audio portions of the media program can be re-established and maintained.

Synchronization Decoding

Figure 5:
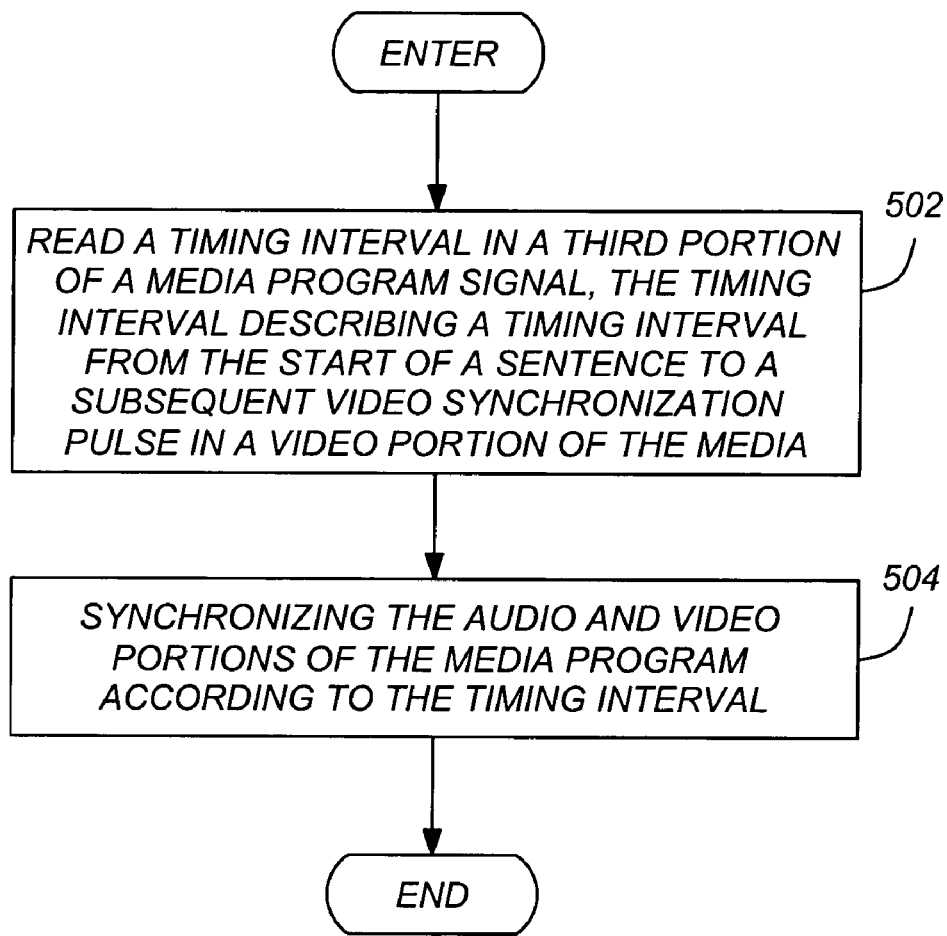
FIG. 5 is a flow chart illustrating exemplary method steps that can be used to decode and use the synchronization information.

FIG. 5 is a flow chart illustrating exemplary method steps that can be used to decode and use the synchronization information. Synchronization information such as a timing interval disposed in a third portion of a media program signal is read, as shown in block 502. The audio and video portions of the media program can then be synchronized using the timing interval, as shown in block 504.

In one embodiment, the foregoing steps are performed by the synchronizing detector 116 and the synchronizer 118 of the synchronizing decoder 114 shown in FIG. 1. The sync-encoded media program signal 120 is provided to the synchronizing detector 116, which reads and processes the timing interval in a third portion of the media program signal. A communicatively coupled synchronizer 118 accepts the timing interval uses the timing interval to synchronize the audio and video portions of the media program. Typically, this synchronization is performed by delaying or advancing the audio portion of the media program relative to the video portion of the media program using audio delay element 118A. However, the video portion of the media program can be delayed or advanced using video delay element 118B, while leaving the audio portion timing untouched, if desired. Further, both the audio and video portions of the media program can be adjusted, if desired.

In one embodiment, the synchronizing detector 116 processes the timing interval in the third portion of the media program signal by generating a second timing reference, using techniques analogous to those outlined above. A valid value for the second timing reference is between −200 milliseconds and +217 milliseconds for 30 frame systems, and between −200 and +220 milliseconds for 25 frame systems. The second timing reference is compared to the timing reference $\Delta t_{SoS-sync}$ 474 read from the third portion of the media program signal. The difference between the first and second timing references represents a lipsync error. Typically, the lipsync error is within ±200 milliseconds. The synchronizer 552 adjusts the timing of the video or audio portions of the media program signal (or both) to account for this lipsync error.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, it is noted that the functions depicted and described in the foregoing disclosure can be implemented by one or more hardware modules, one or more software modules defining instructions performed by a processor, or a combination of both as desired.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of synchronizing audio and video portions of a media program signal, comprising the steps of:

detecting an audio event in the audio portion of the media program signal;

measuring a timing interval from the audio event to a subsequent video synchronization pulse in the video portion of the media program signal; and storing the timing interval in a third portion of the media program signal;

wherein the audio event comprises a start of sentence, and the step of detecting the audio event comprises the steps of:

determining a silence interval $\Delta t_{silence}$ during which an amplitude of the audio portion of the media program signal remains below a silence threshold $T_{silence}$ for a minimum silence interval time period min $\Delta t_{silence}$; and identifying the start of sentence as a time after the silence interval $\Delta t_{silence}$ and in which the audio portion of the media program signal rises from below the silence threshold $T_{silence}$ to above a syllable threshold $T_{syllable}$ within a syllable rise time $\Delta t_{syllable}$.

2. The method of claim 1, wherein the third portion of the media program signal is a closed-captioning portion of the media program signal.

3. The method of claim 1, wherein:

min $\Delta t_{silence}$ is approximately 20 milliseconds;

$T_{silence}$ is approximately 26 dB below an AGC threshold;

$T_{syllable}$ is approximately 6 dB below the AGC threshold;

$\Delta t_{syllable}$ is less than two milliseconds.

4. The method of claim 1, wherein the step of detecting an audio event in the audio portion of the media program signal comprises the steps of:

generating a monaural signal from the audio portion if the audio portion comprises greater than one channel.

5. The method of claim 4, wherein the audio event is a start of sentence and step of detecting the audio event further comprises the steps of:
bandpass filtering the audio signal to approximately a vocal bandpass range; and
normalizing an audio level of the bandpass filtered audio signal according to an automatic gain control (AGC) threshold.

6. The method of claim 5, further comprising the steps of:
rectifying the audio level-normalized and bandpass filtered audio signal; and
low pass filtering the rectified, audio level normalized and bandpass filtered audio signal.

7. The method of claim 1, wherein the step of storing the timing interval in a third portion of the media program signal comprises the step of:
associating the time interval with one of a plurality of non-printing timing reference characters;
storing the non-printing reference characters.

8. An apparatus for synchronizing audio and video portions of a media program signal, comprising:
means for detecting an audio event in the audio portion of the media program signal;
menus for measuring a dining interval from the audio event to a subsequent video synchronization pulse in the video portion of the media program signal; and
means for storing the timing interval in a third portion of the media program signal;
wherein the audio event comprises a start of sentence and the means for the audio event comprises:
means for determining a silence interval $\Delta t_{silence}$ during which an amplitude of the audio portion of the media program signal remains below a silence threshold $T_{silence}$ for a minimum silence interval time period min $\Delta t_{silence}$; and
means for identifying the start of sentence as a dine after the silence interval $\Delta t_{silence}$ and in which the audio portion of the media program signal rises from below the silence threshold $T_{silence}$ to above a syllabic threshold $T_{syllable}$ within a syllable rise time $\Delta t_{syllable}$.

9. The apparatus of claim 8, wherein the third portion of the media program signal is a closed-captioning portion of the media program signal.

10. The apparatus of claim 8, wherein:
min $\Delta t_{silence}$ is approximately 20 milliseconds;
$T_{silence}$ is approximately 26 dB below an AGC threshold;
$T_{syllable}$ is approximately 6 dB below the AGC threshold;
$\Delta t_{syllable}$ is less than two milliseconds.

11. The apparatus of claim 8, wherein the means for detecting the audio event comprises:
means for generating a monaural signal from the audio portion if the audio portion comprises greater than one channel.

12. The apparatus of claim 11, wherein the audio event comprises a start of sentence, and the means for detecting the audio event further comprises:
means for bandpass filtering the audio signal to approximately a vocal bandpass range; and
means for normalizing an audio level of the bandpass filtered audio signal according to an automatic gain control (AGC) threshold.

13. The apparatus of claim 12, further comprising:
means for rectifying the audio level-normalized and bandpass filtered audio signal; and
means for low pass filtering the rectified, audio level normalized and bandpass filtered audio signal.

14. The apparatus of claim 8, wherein the means for storing the timing interval in a third portion of the media program signal comprises:
means for associating the time interval with one of a plurality of non-printing timing reference characters;
means for storing the non-printing reference characters.

15. An apparatus for synchronizing audio and video portions of a media program signal, comprising:
an audio event detector for detecting an audio event in the audio portion of the media program signal, the audio event detector comprising a bandpass filter for filtering the audio portion of the media program signal and an automatic gain control module for normalizing an audio level of the bandpass filtered audio signal according to an automatic gain control (AGC) threshold;
timer for measuring the timing interval from the audio event to a subsequent video synchronization pulse in the video portion of the media program signal; and
a processor for storing the timing interval in a third portion of the media program signal;
wherein the audio event detector comprises a voice detector which determines a silence interval $\Delta t_{silence}$ during which an amplitude of the normalized audio signal remains below a silence threshold $T_{silence}$ for a minimum silence interval time period min $\Delta t_{silence}$ and identifies the start of sentence as a time after the silence interval $\Delta t_{silence}$ and in which the audio portion of the media program signal rises from below the silence threshold $T_{silence}$ to above a syllable threshold $T_{syllable}$ within a syllable rise time $\Delta t_{syllable}$.

16. The apparatus of claim 15, wherein the third portion of the media program signal is a closed-captioning portion of the media program signal.

17. The apparatus of claim 15, wherein the audio event detector further comprises:
a rectifier for rectifying the audio level-normalized and bandpass filtered audio signal; and
a low pass filter for filtering the rectified, audio level normalized and bandpass filtered audio signal.

18. The apparatus of claim 15, it wherein:
min $\Delta t_{silence}$ is approximately 20 milliseconds;
$T_{silence}$ is approximately 26 dB below an AGC threshold;
$T_{syllable}$ is approximately 6 dB below the AGC threshold;
$\Delta t_{syllable}$ is less than two milliseconds.

19. The apparatus of claim 15, wherein the processor associates the time interval with one of a plurality of non-printing timing reference characters and for storing the non-printing reference characters in the memory.

20. A method of synchronizing audio and video portions of a media program signal, comprising the steps of:
detecting an audio event in the audio portion of the media program signal, comprising the step of generating a monaural signal from the audio portion if the audio portion comprises greater than one channel;
measuring a timing interval from the audio event to a subsequent video synchronization pulse in the video portion of the media program signal; and
storing the timing interval in a third portion of the media program signal;
wherein the audio event comprises a start of sentence, and the step of detecting the audio event comprises the steps of:
determining a silence interval $\Delta t_{silence}$ during which an amplitude of the audio portion of the media program signal remains below a silence threshold $T_{silence}$ for a minimum silence interval time period min $\Delta t_{silence}$; and identifying the start of sentence as a time after the silence interval $\Delta t_{silence}$ and in which the audio portion of the media program signal rises from below the silence threshold $T_{silence}$ to above a syllable threshold $T_{syllable}$ within a syllable rise time $\Delta t_{syllable}$.

21. The method of claim 20, wherein the third portion of the media program signal is a dosed-captioning portion of the media program signal.

22. The method of claim 20, wherein:
min $\Delta t_{silence}$ is approximately 20 milliseconds;
$T_{silence}$ is approximately 26 dB below an AGC threshold;
$T_{syllable}$ is approximately 6 dB below the AGC threshold;
$\Delta t_{syllable}$ is less than two milliseconds.

23. The method of claim 20, wherein the audio event is a start of sentence and step of detecting the audio event further comprises the steps of:
bandpass filtering the audio signal to approximately a vocal bandpass range; and
normalizing an audio level of the bandpass filtered audio signal according to an automatic gain control (AGC) threshold.

24. The method of claim 23, further comprising the steps of:
rectifying the audio level-normalized and bandpass filtered audio signal; and
low pass filtering the rectified, audio level normalized and bandpass filtered audio signal.

25. The method of claim 20, wherein the step of storing the timing interval in a third portion of the media program signal comprises the step of:
associating the time interval with one of a plurality of non-printing timing reference characters;
storing the non-printing reference characters.

26. An apparatus for synchronizing audio and video portions of a media program signal, comprising:
means for detecting an audio event in the audio portion of the media program signal, comprising means for generating a monaural signal from the audio portion if the audio portion comprises greater than one channel;
means for measuring a timing interval from the audio event to a subsequent video synchronization pulse in the video portion of the media program signal; and
means for storing the timing interval in a third portion of the media program signal;
wherein the audio event comprises a start of sentence and the means for the audio event comprises:
means for determining a silence interval $\Delta t_{silence}$ during which an amplitude of the audio portion of the media program signal remains below a silence threshold $T_{silence}$ for a minimum silence interval time period min $\Delta t_{silence}$; and
means for identifying the start of sentence as a time after the silence interval $\Delta t_{silence}$ and in which the audio portion of the media program signal rises from below the silence threshold $T_{silence}$ to above a syllable threshold $T_{syllable}$ within a syllable rise time $\Delta t_{syllable}$.

27. The apparatus of claim 26, wherein the third portion of the media program signal is a closed-captioning portion of the media program signal.

28. The apparatus of claim 26, wherein:
min $\Delta t_{silence}$ is approximately 20 milliseconds;
$T_{silence}$ is approximately 26 dB below an AGC threshold;
$T_{syllable}$ is approximately 6 dB below the AGC threshold;
$\Delta t_{syllable}$ is less than two milliseconds.

29. The apparatus of claim 26, wherein the audio event comprises a start of sentence, and the means for detecting the audio event further comprises:
means for bandpass filtering the audio signal to approximately a vocal bandpass range; and
means for normalizing an audio level of the bandpass filtered audio signal according to an automatic gain control (AGC) threshold.

30. The apparatus of claim 29, further comprising:
means for rectifying the audio level-normalized and bandpass filtered audio signal; and
means for low pass filtering the rectified, audio level normalized and bandpass filtered audio signal.

31. The apparatus of claim 26, wherein the means for storing the dining interval in a third portion of the media program signal comprises:
means for associating the time interval with one of a plurality of non-printing timing reference characters;
means for storing the non-printing reference characters.

* * * * *